Aug. 5, 1930.   M. G. P. PHILLIPS   1,772,014
MACHINE FOR STRIPPING TOBACCO LEAVES
Filed Aug. 12, 1927   3 Sheets-Sheet 2
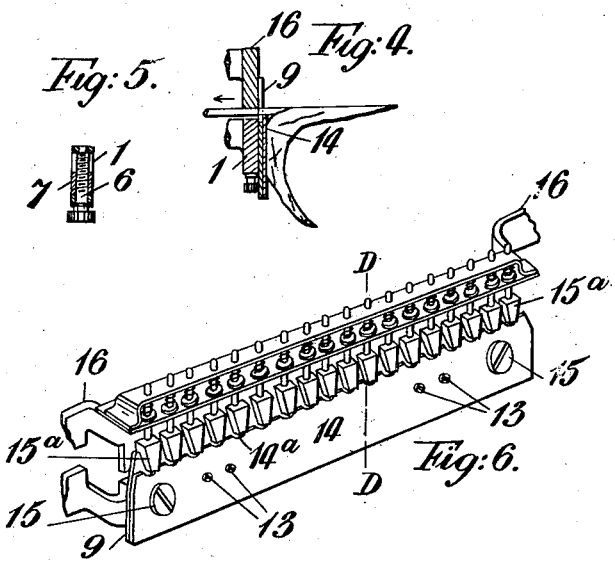
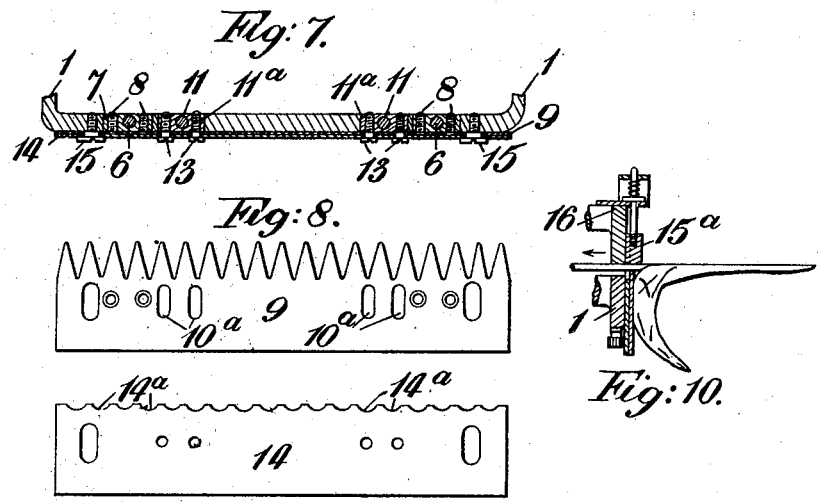
Inventor;
Morris Godfrey Philip Phillips,
By his Atty, Harold D. Penney

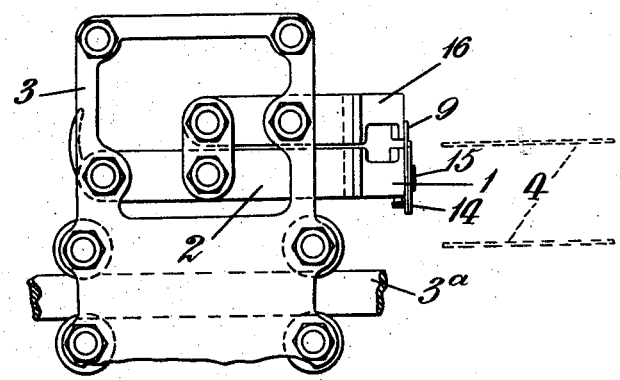
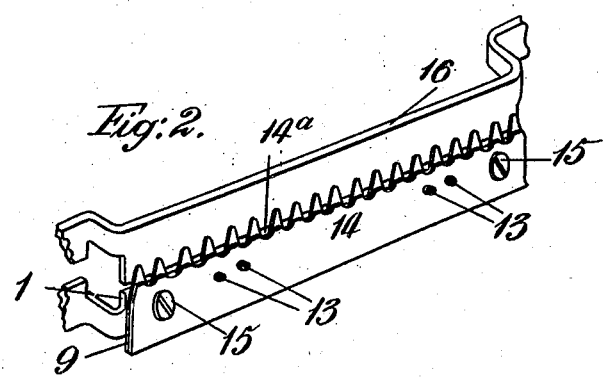
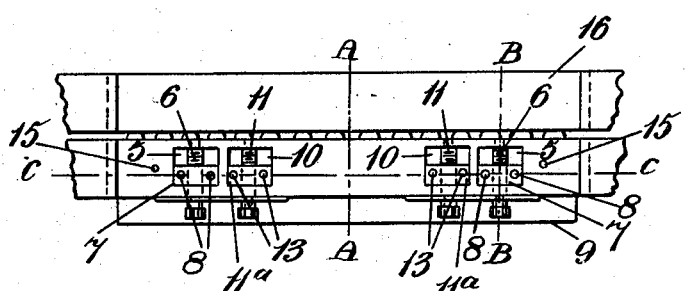

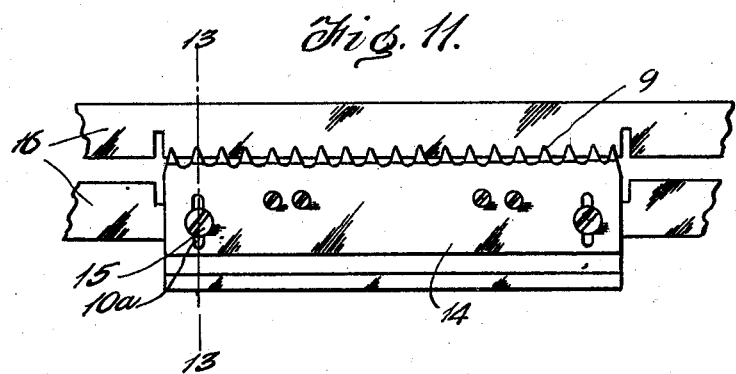
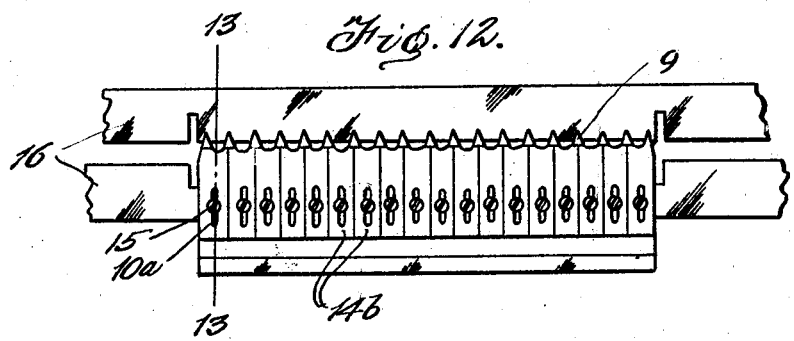
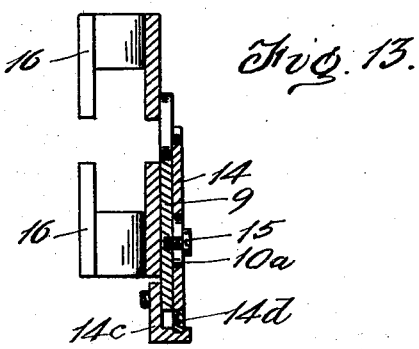

Patented Aug. 5, 1930

1,772,014

UNITED STATES PATENT OFFICE

MORRIS GODFREY PHILIP PHILLIPS, OF LONDON, ENGLAND

MACHINE FOR STRIPPING TOBACCO LEAVES

Application filed August 12, 1927, Serial No. 212,516, and in Great Britain May 20, 1927.

This invention relates to machines for stripping tobacco leaves and it refers to machines in which the stripping is effected by means of a stripping device having a number of teeth or serrations, the interspaces of which form individual stripping elements adapted to engage and act upon a number of leaves simultaneously, provision being made for retaining the stems in said interspaces throughout the stripping operation.

The present invention has for its object certain improvements designed to secure the more efficient stripping of the stem.

In practice the diameter of the stems of different types of leaves may vary considerably, with the result that the position they occupy between the teeth is such that efficiency of the stripper is not secured, a certain amount of leaf being left upon the stem. Tobacco leaves as presented to the stripping device frequently have the stems in a more or less twisted condition so that the plane of the web is not at or substantially at a right angle to the longitudinal axis of the teeth.

According to the present invention the more effective operation of the stripper is secured by varying the effective area of the leaf engaging spaces.

According to one form of the present invention the front of the stripper proper is so mounted upon its support as to permit of its ready adjustment in a direction transversely of its length, and further has secured to it either adjustably in relation to it, or fixed, a resiliently mounted or rigid member or members, having channels therein which are disposed opposite the interspaces of the teeth, whereby when the member which acts to retain the leaves in the stripper comes into operation, the stems are pressed on to the said resilient or other member or members and occupy such a position as will permit the most effective action of the stripper, the stem moreover being enclosed upon substantially all sides.

In order that the invention may be the better understood drawings are appended showing one form of the invention in which:—

Fig. 1 is a side view showing the stripping elements applied to a stripping machine.
Fig. 2 is a perspective view.
Fig. 3 is a rear view of the stripping elements.
Fig. 4 is a section on line A—A Fig. 3 showing one of the leaves being stripped from its stem.
Fig. 5 is a section on line B—B Fig. 3.
Fig. 6 is a perspective view of the stripping elements showing certain modifications.
Fig. 7 is a section on line C—C Fig. 3.
Fig. 8 is a view showing the comb.
Fig. 9 is a view of the member co-operating with the comb.
Fig. 10 is a section on line D—D Fig. 6.
Fig. 11 is a face view of a further modification of the invention.
Fig. 12 is a face view of a still further modification, similar to that shown in Fig. 11.
Fig. 13 is a section on the line 13—13 of Figs. 11 and 12.

Referring to the accompanying drawings, 1 indicates a bar disposed transversely of the machine and which bar is secured at each end to an arm such as 2 (Fig. 1) each of which arms is pivotally connected at its opposite end to a carriage 3 having a reciprocal motion in the horizontal plane along supporting rails such as 3ª. The arms are actuated at the desired points in the travel of the carriage to cause the comb to engage the leaves, which leaves are supported with their butt ends projecting inwards by a belt 4. As the mechanism by which the foregoing operations are effected forms no part of the present invention detailed description thereof is not necessary.

The bar 1 is slotted transversely at two points indicated by 5 the bar being drilled and tapped for the passage of screws 6, the upper ends of which screws engage blocks 7 slidable in the slots 5, said blocks 7 being drilled and tapped to engage screws 8 whereby the comb-like plate 9 is secured to said blocks. By means of the screws 6 the comb-like plate 9, having inverted V shaped teeth, may be moved transversely of bar 1, and so vary the lateral dimensions of the opening through which the leaf is drawn.

This adjustment of the bar 9, if relied upon solely, would in the case where the adjustment is made for stalks of small diameter permit them to be wedged in the lower portion of the V and prevent its movement therethrough without breaking. Moreover, if adjusted for a stalk of large diameter, so much space would be left that parts of the web of the leaf would pass through without being stripped.

Also formed in the bar 1 are other transverse slots 10 in which are slidably supported, by means of screws 11 other blocks 11ᵃ to which are secured by screws 13 a bar or plate 14, the upper edge of which is provided with a series of channels 14ᵃ which are so disposed that they coincide with the interspaces between the teeth of the comblike plate 9. The screws 13 pass through openings 10ᵃ running transversely of the comblike plate 9. By turning the screws 11 in one or other direction the bar or plate 14 may be adjusted transversely of the bar 1 and plate 9. To clamp the parts in their adjusted positions screws 15 are provided which pass through slots in both plates 9 and 14 and are tapped into the bar 1.

In order to ensure the proper engagement of the stems with the channels 14ᵃ of bar 14, there are provided spring pressed blocks 15ᵃ (Fig. 6) preferably mounted upon the bar or plate 16 whereby the leaves are retained in the interspaces of the comblike plate 9, and which blocks whilst yielding to accommodate the stems act to press them down within the channels 14ᵃ of plate 14, and preferably the active surfaces of said blocks are also grooved or channelled. Blocks, springs or the like may also be provided upon the member 14, with or without blocks or the like upon the plate 16. The blocks or the like upon the member 14 serve to automatically compensate for variations between the average adjustment required for a particular type of leaf, and which average adjustment is effected by the setting of the plate 14, and variations between individual stems which may be present in that type.

Instead of being rigid upon the comblike plate 9, the bar or plate 14 may be resiliently mounted thereon, or again instead of a single plate 14 a number of independent resilient or resiliently mounted bodies 14ᵇ (see Fig. 12) may be substituted, which bodies 14ᵇ may either be formed of blocks of wood, metal or other hard or substantially hard material mounted upon springs secured to the front of the stripper, or they may themselves be in the form of U shaped springs arranged with the limb longitudinally of the leaf and with the upper and free member engaging the stem, or a strip of rigid material, as 14ᶜ in Figures 11, 12 and 13 with an india rubber flange 14ᵈ may be employed extending along the face of the stripper, or again blocks of rubber may be provided. Or, as previously stated, the plate 14 may have a series of resiliently mounted or other bodies upon the front thereof, thereby automatically adapting the tooth spaces to the size of each individual stalk.

In all cases it is preferred that the surface of the wood, rubber or other material where it engages the stem should be slightly curbed or grooved.

Obviously the channelled plate instead of being secured to the support for the first plate may be adjustably secured to said comblike plate.

Claims:

1. A stripper for tobacco leaves comprising a comblike member and means for initially varying the effective area of the leaf engaging spaces of said comblike member.

2. A stripper for tobacco leaves, comprising a comb like member, a support for said member and means, adjustably connected to said support, for varying the effective area of the leaf engaging spaces of said comb like member.

3. A stripper for tobacco leaves comprising a comblike member, a support for said member, means adjustably securing said comblike member to said support and means adjustably connected to said support, for initially varying the effective area of the leaf engaging spaces of said comblike member.

4. A stripper for tobacco leaves comprising a comblike member, a support for said member, means adjustably securing said comblike member to said support and means for varying the effective area of the leaf engaging spaces of said comblike member, comprising an adjustably mounted member, grooves in said member coinciding with the leaf engaging spaces of the comblike member.

5. A stripper for tobacco leaves comprising a comblike member, a support for said member, means adjustably securing said comblike member to said support and means for varying the effective area of the leaf engaging spaces of said comblike member, comprising an adjustably and resiliently mounted member, grooves in said member coinciding with the spaces of the comblike member.

6. A stripper for tobacco leaves comprising a comblike member, a support for said member, means adjustably securing said comblike member to said support and means for varying the effective area of the leaf engaging spaces of said comblike member, comprising adjustably mounted members, a groove in each of said members coinciding with the groove in the comblike member.

7. A stripper for tobacco leaves comprising a comblike member, a support for said member, means adjustably securing said comb-like member to said support and means for varying the effective area of the leaf engaging spaces of said comblike member, comprising resiliently mounted members, a groove in each of said members coinciding with the groove in the comblike member.

8. A stripper for tobacco leaves comprising a comblike member, a bar, transversely disposed slots in said bar, blocks slidable in said slots, screw-threaded holes in said blocks, screws engaging said holes whereby the blocks may be adjusted transversely of the bar, a comblike member connected to the blocks, a second series of slots in the bar, blocks slidable in said second series of slots, screw-threaded holes in said blocks, screws engaging said holes whereby the said blocks may be adjusted transversely of the bar and the comblike member, a plate connected to said second series of adjustable blocks, and grooves in said plate coincident with the leaf engaging spaces of said comblike member.

9. A stripper for tobacco leaves comprising a comblike member, means for retaining the leaves in the interspaces of said comblike member, resiliently mounted members upon said retaining means, grooves upon said members coinciding with the leaf engaging spaces of the comblike member, a bar, transversely disposed slots in said bar, blocks slidable in said slots, screw-threaded holes in said blocks, screws engaging said holes whereby the blocks may be adjusted transversely of the bar, a comblike member connected to the blocks, a second series of slots in the bar, blocks slidable in said second series of slots, screw-threaded holes in said blocks, screws engaging said holes whereby the said blocks may be adjusted transversely of the bar and the comblike member, a plate connected to said second series of adjustable blocks, and grooves in said plate coincident with the leaf engaging spaces of said comblike member.

10. A stripper for tobacco leaves comprising a comblike member, means for retaining the leaves in the interspaces of said comblike member, adjustably and resiliently mounted members upon said retaining means, grooves upon said members coinciding with the leaf engaging spaces of the comblike member, a bar, transversely disposed slots in said bar, blocks slidable in said slots, screw-threaded holes in said blocks, screws engaging said holes whereby the blocks may be adjusted transversely of the bar, a comblike member connected to the blocks, a second series of slots in the bar, blocks slidable in said second series of slots, screw-threaded holes in said blocks, screws engaging said holes whereby the said blocks may be adjusted transversely of the bar and the comblike member, a plate connected to said second series of adjustable blocks, and grooves in said plate coincident with the leaf engaging spaces of said comblike member.

11. A stripper for tobacco leaves comprising a comblike member, a bar, transversely disposed slots in said bar, blocks slidable in said slots, screw-threaded holes in said blocks, screws engaging said holes whereby the blocks may be adjusted transversely of the bar, a comblike member connected to the blocks, a second series of slots in the bar, blocks slidable in said second series of slots, screw-threaded holes in said blocks, screws engaging said holes whereby the said blocks may be adjusted transversely of the bar and the comblike member, a plate connected to said second series of adjustable blocks, and grooves in said plate coincident with the leaf engaging spaces of said comblike member, resiliently mounted members upon the outer face of the grooved plate, grooves in said resiliently mounted members coincident with the grooves of said plate.

12. A stripper for tobacco leaves comprising a comblike member, a bar, transversely disposed slots in said bar, blocks slidable in said slots, screw-threaded holes in said blocks, screws engaging said holes whereby the blocks may be adjusted transversely of the bar, a comblike member connected to the blocks, a second series of slots in the bar, blocks slidable in said second series of slots, screw-threaded holes in said blocks, screws engaging said holes whereby the said blocks may be adjusted transversely of the bar and the comblike member, a plate connected to said second series of adjustable blocks, and grooves in said plate coincident with the leaf engaging spaces of said comblike member, adjustable and resiliently mounted members upon the outer face of the grooved plate, grooves in said resiliently mounted members coincident with the grooves of said plate.

13. A stripper for tobacco leaves comprising a comblike member, a support for said member means adjustably securing said comblike member to said support and means for varying the effective area of the leaf engaging spaces of said comblike member, comprising an adjustably mounted member, grooves in said member coinciding with the leaf engaging spaces of the comblike member, and means for clamping the parts in their adjusted positions.

14. A stripper for tobacco leaves comprising a comblike member, a bar, transversely disposed slots in said bar, blocks slidable in said slots, screw-threaded holes in said blocks, screws engaging said holes whereby the blocks may be adjusted transversely of the bar, a comblike member connected to the blocks, a second series of slots in the bar, blocks slidable in said second series of slots, screw-threaded holes in said blocks, screws engaging said holes whereby the said blocks may be adjusted transversely of the bar and the comblike member, a plate connected to said second series of adjustable blocks and grooves in said plate coincident with the leaf engaging spaces of said comblike member, and means for clamping the parts in their adjusted positions.

In testimony whereof I have hereunto set my hand.

MORRIS GODFREY PHILIP PHILLIPS.